No. 797,845. PATENTED AUG. 22, 1905.
T. A. EDISON.
SHEET METAL FOR PERFORATED POCKETS OF STORAGE BATTERIES.
APPLICATION FILED JULY 21, 1904.

UNITED STATES PATENT OFFICE.

THOMAS A. EDISON, OF ORANGE, NEW JERSEY.

SHEET METAL FOR PERFORATED POCKETS OF STORAGE BATTERIES.

No. 797,845.　　　　　Specification of Letters Patent.　　　　　Patented Aug. 22, 1905.

Application filed July 21, 1904. Serial No. 217,537.

*To all whom it may concern:*

Be it known that I, THOMAS A. EDISON, a citizen of the United States, residing at Llewellyn Park, Orange, Essex county, New Jersey, have invented a certain new and useful Sheet Metal for Perforated Pockets of Storage Batteries, of which the following is a description.

In the manufacture of my improved iron-nickel storage battery I carry the active material in small pockets made of perforated nickel-plated sheet-steel, the bulk of active material in each pocket being so selected that any change in the mass thereof in use will fall within the elastic limits of the sheet metal, whereby the walls of the pocket will always maintain an elastic contact with the active material. I find in practice that in order that the sheet metal may be stiff enough to exert a sufficient elastic pressure on the active mass it should not be less than .0035 of an inch in thickness; but in commercially experimenting with sheet metal of this thickness I discovered that it cannot be practically perforated with the desired fineness, since the dies become quickly worn out.

My invention consists in making the pockets for use in my improved storage battery or in any other storage battery of metal thin enough to be readily perforated—say .0025 of an inch in thickness—and in then applying thereto a very thick plating of nickel to a sufficient extent as to result in the production of a sheet of the proper thickness to give the desired elastic pressure, the thickness of the deposited metal varying, as, for example, between .0005 and .00125 of an inch.

In order that the invention may be better understood, attention is directed to the accompanying drawings, forming a part of this specification, and in which—

Figure 1:
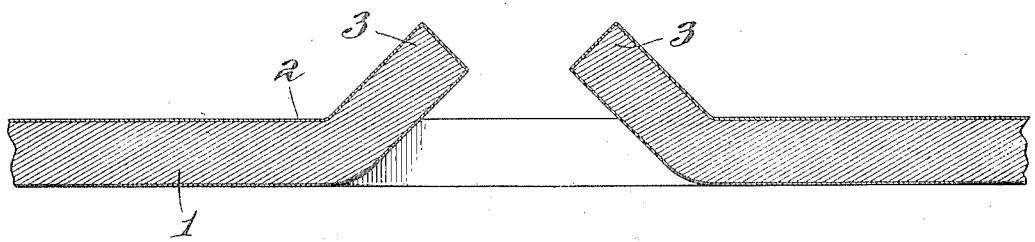
Figure 2:
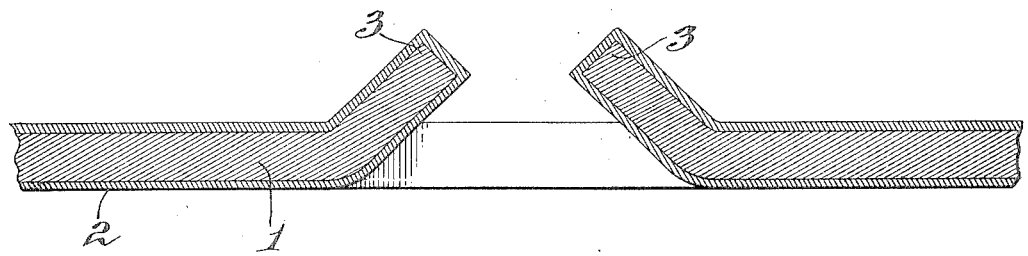

Figure 1 is a sectional view, on a greatly enlarged scale, showing a plate .0035 of an inch in thickness with a protecting-film of nickel thereon, as I have heretofore used in the make-up of my battery. Fig. 2 is a similar view illustrating the present invention.

In these views corresponding parts are represented by the same numerals of reference.

1 represents the plate, and 2 the nickel coating in each case. In forming each perforation the burs 3 will be struck up by means of perforating-dies. With the old practice the plate 1 has been about .0035 of an inch in thickness, since substantially this thickness is necessary in order to provide the desired elastic pressure on the active materials. In this case the nickel coating 2 has been a mere protecting-film. With this practice the thickness of metal used is too great to allow it to be commercially perforated, since the dies become quickly worn out. In Fig. 2, illustrating my present invention, the plate 1 is materially thinner than the plates now used in order that it may be commercially perforated. A plate .0025 of an inch in thickness is shown. In order to give the desired thickness to provide for the necessary elastic pressure, the nickel coating 2 is made very thick, ranging, say, from .0005 up to .00125 of an inch. Such a nickel coating is very much greater than that necessary merely to protect the plate 1 from the electrolytic action and serves additionally to give the necessary elastic pressure. By varying the thickness of the nickel deposit the thickness of the plates can be obviously regulated to accommodate various active materials and variations in bulk. In practice I have constructed sheets in this way as thick as .0050, wherein the original sheet has been only .0025, or, in other words, the thickness of nickel used is as great as the sheet upon which it is deposited. Preferably after the nickel-plated coating has been applied I subject the composite sheet to a welding process, as I describe in my Patent No. 734,522, July 28, 1903, as I find that in this way the nickel coating is much more adherent, while at the same time the elasticity of the sheet is greater than if the welding operation were omitted.

Having now described my invention, what I claim as new therein, and desire to secure by Letters Patent, is as follows:

Metal sheets for use in the make-up of storage batteries, comprising a thin perforated sheet of iron or steel, and a nickel coating applied thereto, of materially greater thickness than that necessary for the protection of the sheet from electrolysis, substantially as and for the purposes set forth.

This specification signed and witnessed this 12th day of July, 1904.

THOS. A. EDISON.

Witnesses:
　FRANK L. DYER,
　ANNA R. KLEHM.